United States Patent
Cheng et al.

(10) Patent No.: US 9,461,482 B2
(45) Date of Patent: Oct. 4, 2016

(54) MULTI-CHEMISTRY BATTERY PACK SYSTEM

(71) Applicants: Win Sheng Cheng, Cupertino, CA (US); Jeff Yeu-Farn Hsieh, Los Altos, CA (US); YiChien Hwang, Fremont, CA (US)

(72) Inventors: Win Sheng Cheng, Cupertino, CA (US); Jeff Yeu-Farn Hsieh, Los Altos, CA (US); YiChien Hwang, Fremont, CA (US)

( * ) Notice: Subject to any disclaimer, the term of this patent is extended or adjusted under 35 U.S.C. 154(b) by 183 days.

(21) Appl. No.: 14/316,502

(22) Filed: Jun. 26, 2014

(65) Prior Publication Data

US 2015/0295420 A1    Oct. 15, 2015

Related U.S. Application Data

(60) Provisional application No. 61/979,936, filed on Apr. 15, 2014.

(51) Int. Cl.
*H02J 7/00* (2006.01)

(52) U.S. Cl.
CPC .............. *H02J 7/0003* (2013.01); *H02J 7/007* (2013.01); *H02J 7/0016* (2013.01); *H02J 7/0021* (2013.01); *H02J 7/0054* (2013.01)

(58) Field of Classification Search
CPC ..... Y02E 60/12; H02J 7/0054; H02J 7/1423; H02J 7/0003; H01M 10/44; H01M 10/46
USPC ........................................................ 320/128
See application file for complete search history.

(56) References Cited

U.S. PATENT DOCUMENTS

| | | | | |
|---|---|---|---|---|
| 6,229,279 B1* | 5/2001 | Dierker | ................. | H02J 7/0013 307/10.1 |
| 7,545,120 B2* | 6/2009 | Breen | ..................... | H02J 7/022 320/111 |
| 2004/0232881 A1* | 11/2004 | Amano | ................... | B60L 11/14 320/104 |
| 2006/0065548 A1* | 3/2006 | Okuno | ............. | H01M 10/4242 205/646 |
| 2006/0214508 A1* | 9/2006 | Binder | ................. | H02J 7/0031 307/10.7 |
| 2010/0138087 A1* | 6/2010 | Takaoka | ................. | B60K 6/365 701/22 |
| 2011/0001352 A1* | 1/2011 | Tamura | ................. | B60R 16/033 307/9.1 |
| 2013/0002016 A1* | 1/2013 | Furukawa | ........... | H01M 10/425 307/9.1 |
| 2015/0097518 A1* | 4/2015 | Bishop | ................. | H02J 7/0003 320/107 |

* cited by examiner

*Primary Examiner* — Arun Williams
(74) *Attorney, Agent, or Firm* — Skaar Ulbrich Macari, P.A.

(57) ABSTRACT

A battery system includes a cell group in a lead-acid battery power system (battery system A) coupled to a battery power system (battery system B) having a different chemistry, such as lithium ion-based battery. Each battery system, A and B, are interconnected at specific cathode and anode contacts chosen based on the voltages range present at those points to prevent damage to the different battery systems. The worst-case voltage range of the battery system A at the connection points is higher than the worst case voltage range of battery system B. The battery system includes a battery management system (BMS) that monitors voltages at each cell level and that monitors current at the pack level. The BMS can also be configured to control conductivity between packs A and B, and to protect battery systems A and B from going out of normal operating conditions.

20 Claims, 3 Drawing Sheets

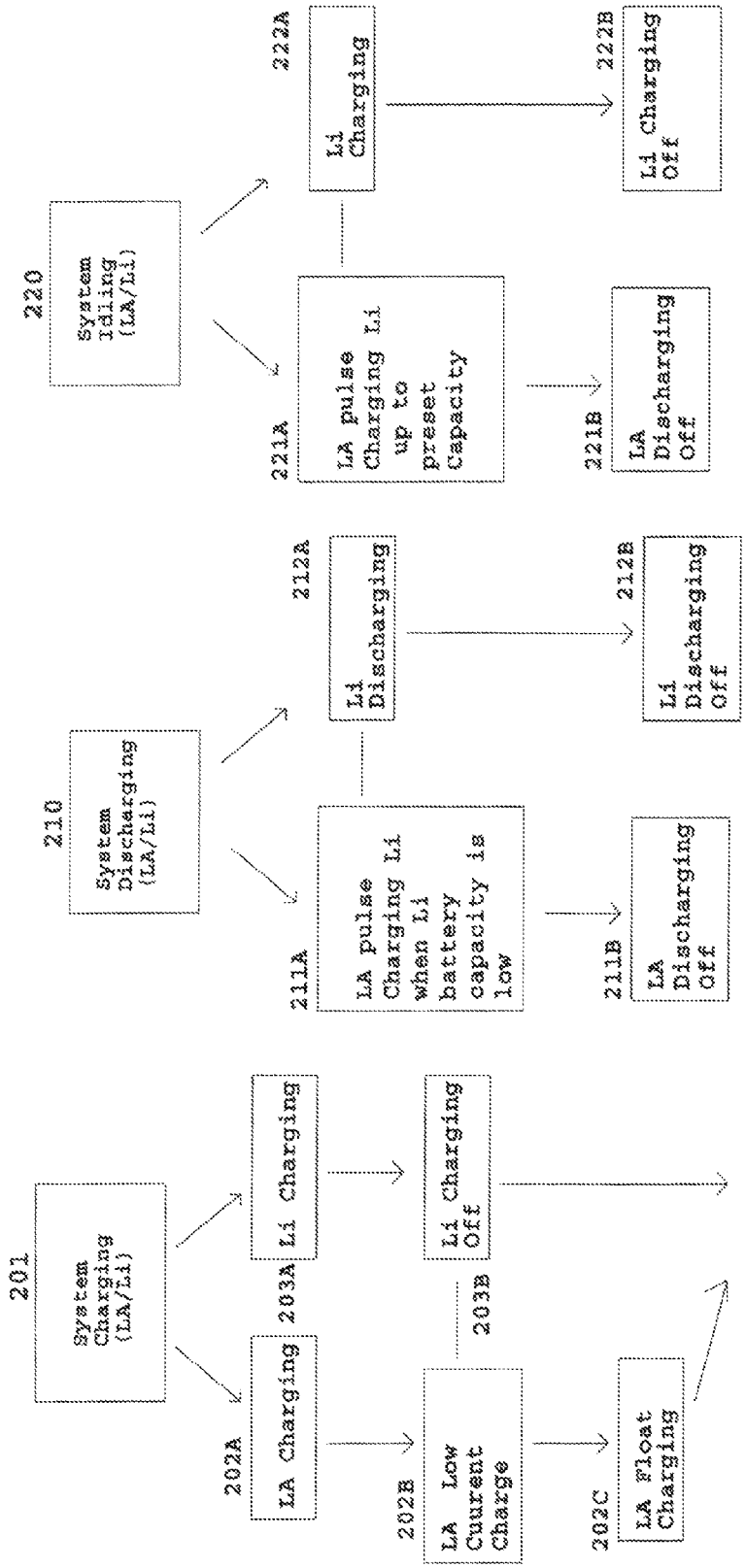

MULTI-CHEMISTRY BATTERY PACK SYSTEM

PRIORITY

This application claims the priority benefit of U.S. Provisional Application No. 61/979,936 filed on Apr. 15, 2014, which is hereby incorporated herein by reference in its entirety.

FIELD

The present invention relates generally to battery systems, and more particularly, to battery systems comprising two or more different battery chemistries.

BACKGROUND

Batteries are increasingly being used as a power source for many different kinds of devices, including small electronics, such as smartphones, to large devices, such as automobiles. The choice of battery chemistry to be used in a given device is typically a compromise of characteristics, such as weight, size, capacity, charge/discharge current, charge time, safety, heat generation, reliability, life span, etc.

Attempts to mix battery chemistries in a given system to reduce the respective compromises presents certain drawbacks. For example, large current flow between cells can occur when voltage levels are different. This is even more dangerous for non-rechargeable batteries where a reverse flow of current may cause the battery to break or explode.

Consequently, there is a need for battery systems and methods that reduce the need to compromise on certain battery system characteristics while addressing the drawbacks of conventional mixed-chemistry systems.

SUMMARY

The present invention addresses the above-noted drawbacks of mixed-chemistry systems by, in certain embodiments, providing a careful selection of the cells and the accompanying voltage level between the portions having different chemistries. In one example embodiment, a battery system includes a cell group in a lead-acid battery power system (battery system A) coupled to a battery power system (battery system B) having a different chemistry, such as lithium ion-based battery. Each battery system, A and B, are interconnected at specific cathode and anode contacts chosen based on the voltages range present at those points to prevent damage to the different battery systems. The worst-case voltage range of the battery system A at the connection points is higher than the worst case voltage range of battery system B. The battery system includes a battery management system (BMS) that monitors voltages at each cell level and that monitors current at the pack level. The BMS can also be configured to control conductivity between battery systems A and B, and to protect battery systems A and B from going out of normal operating conditions. Battery systems A and B can also be both configured as Li batteries, each with a different Li chemistry.

In another example embodiment, a battery system includes a first battery assembly having a first type of battery chemistry and a second battery assembly having a second type of battery chemistry. The second battery assembly is electrically connected in parallel with the first battery assembly. The second type of battery chemistry is different than the first type of battery chemistry. A first switch is disposed between the first battery assembly and second battery assembly. A second switch is disposed between the first battery assembly and second battery assembly. A first current sensor is disposed between the first battery assembly and electrical ground. A second current sensor is disposed between the first battery assembly and electrical ground. A battery management system is coupled to the battery system, the battery management system configured to monitor the voltage of the first battery assembly, monitor the voltage of the second battery assembly, monitor the current of the first current sensor, monitor the current of the second current sensor, and operate the first and second switches according to code resident in the battery management system to control the current path through the battery system such that the current path through the first system and the current path through the second system can be independently controlled.

In a further example embodiment, a method of operating a battery system is disclosed. The battery system includes a first battery pack and a second battery pack. Each of the first and second battery packs comprises a different battery chemistry. The operating method includes coupling the first battery pack to the second battery pack, monitoring a voltage value of the first battery pack, monitoring a voltage value of the second battery pack, monitoring an electrical current value for the first battery pack, monitoring an electrical current value for the second battery pack, and operating a first switch and a second switch to control the current path through the battery system such that the current path through the first system and the current path through the second system can be independently controlled.

In another example embodiment, a battery system includes a lead-acid battery assembly connected in parallel with a lithium-ion battery assembly. A first switch is disposed between the lead-acid battery assembly and the lithium-ion battery assembly. A second switch is disposed between the lead-acid battery assembly and the lithium-ion battery assembly. A first current sensor is coupled to the lead-acid battery assembly. A second current sensor is coupled to the lithium-ion battery assembly. A battery management system is coupled to the battery system. The battery management system is configured to monitor a voltage value for the lead-acid battery assembly and a voltage value for the lithium-ion battery assembly, monitor the first and second current sensors, and operate the first and second switches to ensure that current does not flow from the lithium-ion battery assembly into the lead-acid battery assembly.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 2 is a flow chart of a system charging operational state of a multi-chemistry battery system according to certain example embodiments.

FIG. 3 is a flow chart of a system discharging operational state of a multi-chemistry battery system according to certain example embodiments.

FIG. 4 is a flow chart of a system idling operational state of a multi-chemistry battery system according to certain example embodiments.

Figure 1:
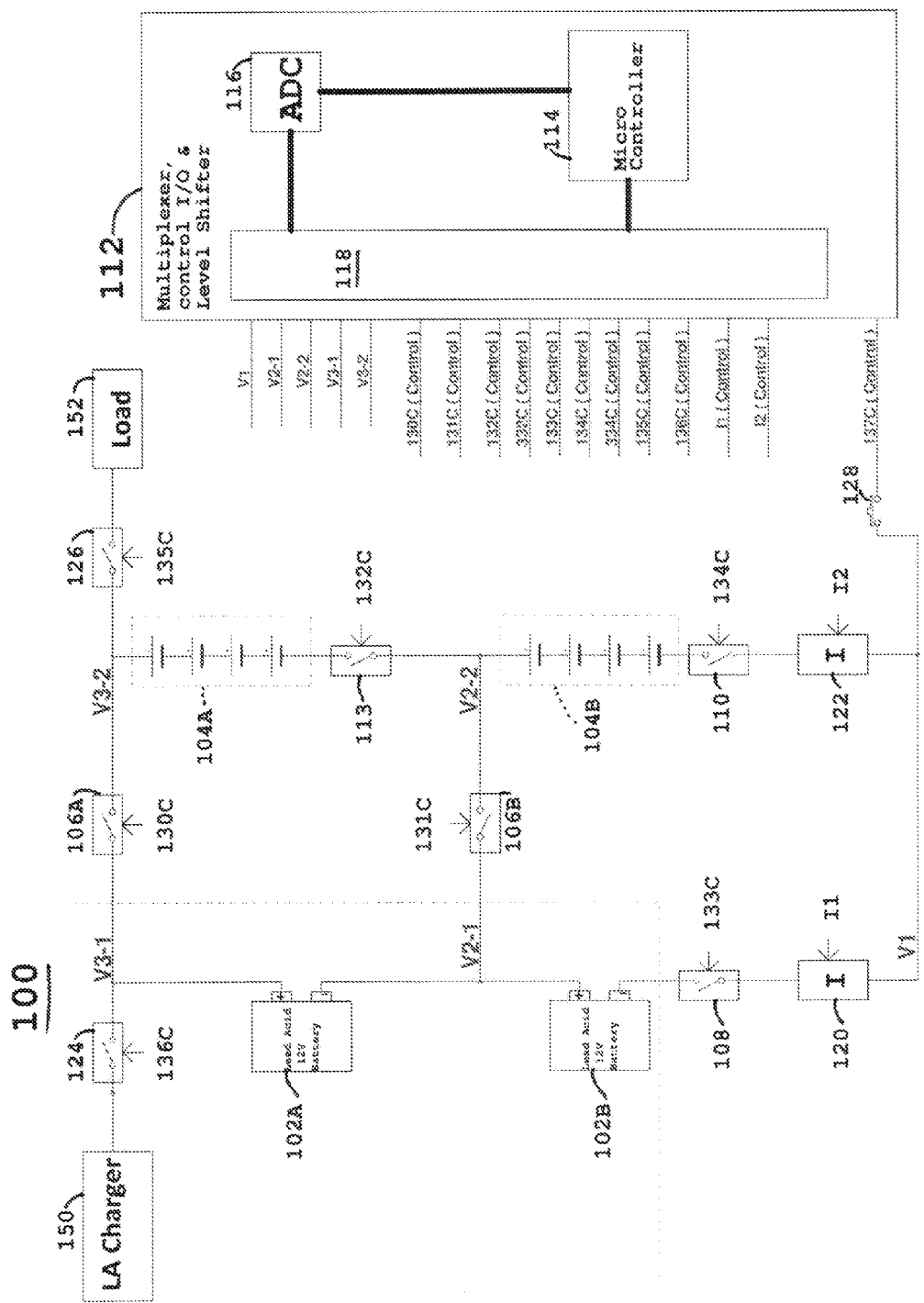
FIG. 1 is a diagram of a multi-chemistry battery system according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIG. 1, a multi-chemistry battery system 100 diagram is shown. The system includes a first 102A lead-acid (LA) battery connected in series with a second LA battery 102B. The assembly of batteries 102A and 102B will be collectively referred to as LA battery assembly 102. In other embodiments, the LA battery assembly 102 can comprise only a single battery, or it may include any number of multiple LA batteries.

The system 100 also includes a lithium-ion (Li) battery assembly 104. The Li battery assembly 104 shown comprises first Li battery cells 104A connected in series with second Li battery cells 104B. Again, the Li battery assembly 104 may include a single cell or battery, or it may include any number of multiple cells or batteries to be matched with LA battery 102A in voltage level.

The LA battery assembly 102 is connected in parallel with the Li battery assembly 104.

Disposed between the LA battery assembly 102 (102A and 102B) and Li battery assembly 104 are a plurality of switches 106A and 106B. These switches 106A and 106B electrically connect discreet points along the LA battery assembly 102 to discreet points along the Li battery assembly 104 in order to be able to electrically isolate one or both of the assemblies 102 and 104. The position of the discreet connection points depends on the chemistry, the voltage of the LA battery 102 and Li battery 104 implemented and the number of assemblies employed.

First, at the point of connection to the switches 106A and 106B between the two battery assemblies 102 and 104 of different chemistries, the total voltage of the Li battery assembly 104 must be less than the total voltage of the LA batteries 102A and 102B. This ensures that electric current always flows from LA batteries 102A and 102B to Li batteries 104A and 104B. Note that in FIG. 1, the nominal total voltage of the LA battery assembly 102 is 24V, but the total voltage can be altered by adding or eliminating individual LA batteries. For example, four such 12V batteries connected in series in the LA assembly 102 would be 48V.

Second, since there is a voltage differential between the LA battery assembly 102 and the Li battery assembly 104, the switches 106A and 106B are intelligently controlled and the voltages at the discreet connection points are monitored to prevent the Li batteries 104A and 104B from being overcharged.

Third, LA batteries and Li batteries have different charging characteristics. As a result, switch 108 is disposed adjacent the LA battery assembly 102, and switch 110 is disposed adjacent the Li battery assembly 104. Additionally, a switch 113 is disposed between the individual Li batteries 104A and 104B in the assembly 104. Switches 108, 110 and 113 are intelligently controlled to allow for special cases such as LA floating charge conditions.

A battery management system (BMS) control section 112 is operatively coupled to the battery assemblies 102 and 104, and to the various switches described herein to provide for the intelligent control as described herein. The BMS can include a plurality of switches (e.g. power MOSFETs) and a micro-controller unit (MCU) 114. The MCU 114 includes memory to store and a processor to execute computer code governing the MCU's operation to monitor and control the various aspects of battery system 100 described herein.

The MCU 114 is coupled to an ADC (analog to digital conversion) unit 116 and a multiplexer, I/O (Input & Output) control and level shifters 118. These components 116 and part of 118 can alternatively be integrated into the MCU 114.

The switches 106A and 106B are digitally controlled by the MCU 114 to throttle the amount of charge flowing into the Li batteries from the LA batteries. The MCU 114 is programmed to turn the switches 106A and 106B on/off through control signals 130C and 131C. As a result, the amount of charge flowing from LA assembly 102 to Li assembly 104 can be determined by monitoring the voltages V2-1, V2-2, V3-1, V3-2 as indicated in FIG. 1 and also by monitoring current I1 and I2 via current sensors 120 and 122, respectively. Current sensor 120 is disposed adjacent switch 108 and located opposite the LA battery 102B connected to the switch 108. Current sensor 122 is disposed adjacent switch 110 and located opposite the Li battery 104B connected to the switch 110.

Switches 108, 110, 113 are controlled by MCU 114 for at least two purposes. First, MCU 114 controls the current path of the multi-chemistry battery system 100. MCU 114 can choose to allow current to flow through either one selected battery chemistry/assembly (102 or 104) or both chemistries/assemblies combined. This control is performed during all modes of operation. Second, the switches 108, 110 and 113 provide protection to the overall battery system 100, or portions thereof, by preventing the system, or parts thereof, from being operated outside of specified tolerances. MCU 114 is configured to selectively disable one selected battery chemistry/assembly current path or both battery chemistry/assembly current paths to prevent damage to the respective batteries or the causing of hazardous conditions.

The battery system 100 can be configured, for example, either as a Li adapter electrically connected to an existing native LA battery pack, or as a stand-alone multi-chemistry battery pack. In the former example, the LA batteries 102A and 102B would represent the existing native battery pack, while the remaining components would be joined thereto as an adaptor system.

In one example embodiment, the LA battery used is a standard LA battery having a nominal 12V per unit. However, the battery need not be limited to LA chemistry or to 12V. The Li chemistry used in one example embodiment is LiFePo4, which has a nominal operating voltage of 3.3 V.

Although, other Li chemistries and voltages can be employed without departing from the scope of the invention.

In additional embodiments, the Li batteries can be used for both different chemistry battery portions/assemblies. For example, the battery assembly 102 in FIG. 1 can be a first Li-ion chemistry and the battery assembly 104 can be a Li-ion battery having a second chemistry that is different than the Li-ion chemistry of the first Li-ion battery assembly 102.

Referring to FIGS. 2-4, the operation of the multi-chemistry battery system 100 can be classified into one of three main operating states, system charging 201 (FIG. 2), system discharging 210 (FIG. 3), and system idling 220 (FIG. 4). System charging 201 occurs when the battery system 100 is connected to a charger 150 powered by a major power source such as charging station or power grid. System discharging 210 occurs when the battery system 100 is the source of energy for powering external devices such as a golf cart. System idling 220 occurs when the battery system 100 is neither electrically connected to a power source nor powering an external device (at high loading condition).

During system charging 201, both LA 102 and Li 104 battery assemblies are being charged by the charger 150 initially indicated in FIG. 2 as LA charging 202A and Li charging 203A. The voltage of charger 150 is set to the full charge voltage of 102 which is slightly higher than 104. The Li battery assembly 104 will reach full charge earlier since it has lower internal resistance and normally lower capacity than LA battery assembly 102, and the combined voltage level of the Li battery assembly 104 is lower than and close to that of the LA battery assembly 102. When this condition is met, the Li battery charging will be turned off 203B by disabling switches 106A and 106B. Correspondingly, the LA battery assembly 102 will continue to charge by itself until it reaches low current charging 202B. As the LA battery assembly 102 reaches its final stage of charging, LA float charging 202C, is achieved. When the LA battery assembly 102 is fully charged, the charger 150 automatically enters floating charging mode 202C. When the charger 150 is disconnected 204, MCU 114 is configured to enable both battery chemistry current paths by closing switch 108, 110 and 113.

Referring to FIG. 3, system discharge 210 is determined by the MCU 114 when a certain current threshold is detected flowing through the Li current sensor 122. During normal operation, switch 124 (disposed between the charger 150 and battery system 100) is normally closed unless both the LA battery assembly 102 and Li battery assembly 104 discharge to preset capacity, voltage and/or temperature. When MCU 114 determines that the system 100 is undergoing discharging and the Li assembly 104 is discharging 212A, the MCU 114 will pulse open and close switches 106A only, or both 106A and 106B, allowing the LA battery assembly 102 to also drive the load 152 (LA discharge 211A) but at a lower driving current. Since the total Li battery 104 capacity is lower in this example than the LA battery 102 capacity, the Li battery 102 will discharge to empty first. At the same time, the MCU 114 is configured to control the switches 106A, 106B and 108 so that the LA battery assembly 102 will also be able to support the Li battery assembly 104 during discharging. When the Li battery 104 capacity is decreased to the point where its current driving capability is reduced, the LA battery assembly 102 will take over to drive the load 152 and potentially also charge the Li battery assembly 104.

If the Li battery assembly 104 is determined by the MCU 114 to be in an over-discharged condition, the MCU 114 is configured to turn off the Li current path 212B by alternatively opening the switches 110 and 113 until the Li battery assembly 104 is sufficiently charged by the LA battery assembly 102 so as to no longer be in an over-discharged state, or once the Li battery assembly 104 reaches a certain charging value set point. If the LA battery assembly 102 capacity is also near its empty state, MCU 114 is configured to disable the entire battery system 211B by opening switches 108 and 110 to prevent damage to the batteries 102 and 104. MCU 114 will re-enable the system only if: 1) a charger 150 is connected to the system 100, or 2) the LA battery assembly 102 has rested sufficiently to safely deliver more current.

Referring to FIG. 4, system idling 220 occurs when no charger 150 is connected and all current paths indicate low or zero discharge. In this state, the LA battery assembly 102 is used to pulse charge the Li battery 104 (222A) if there is enough capacity in the LA battery 102 to safely perform such action. This LA to Li charging stops when either the Li batteries 104 have charged to the same voltage level as the LA battery assembly 102 or the LA battery capacity is deemed to be below threshold. MCU 114 is configured to determine when to turn off the LA discharge 221B or Li charging 222B.

In use, when the Li battery assembly or pack 104 is initially connected to the LA battery assembly or pack 102, the control section of battery management system (BMS) 112 performs an initial system measurement and check before electrically connecting the two packs 102, 104 together. This is done in two stages, first is to measure Li pack 104 status, and second to measure LA pack 102 status. A determination is made by the MCU 114 to ensure that when the two packs conduct, no hazardous conditions exist.

Distributed charging is used to improve LA battery assembly 102 charging rate. During charging, the LA pack 102 is carefully monitored to perform balancing. The Li pack 104 is to complete its charging before the LA pack 102 has been fully charged. This prior completion of the Li pack charging can be accomplished, for example, by electrically isolating the LA pack from the Li pack during Li pack charging.

The multi-chemistry battery system shown in FIG. 1 includes only one LA battery assembly 102 and one Li battery assembly 104. However, in alternative embodiments, multiples of one or both assemblies can be provided, each being connected in parallel or series. An example of one such alternative is shown in FIG. 5.

Figure 5:
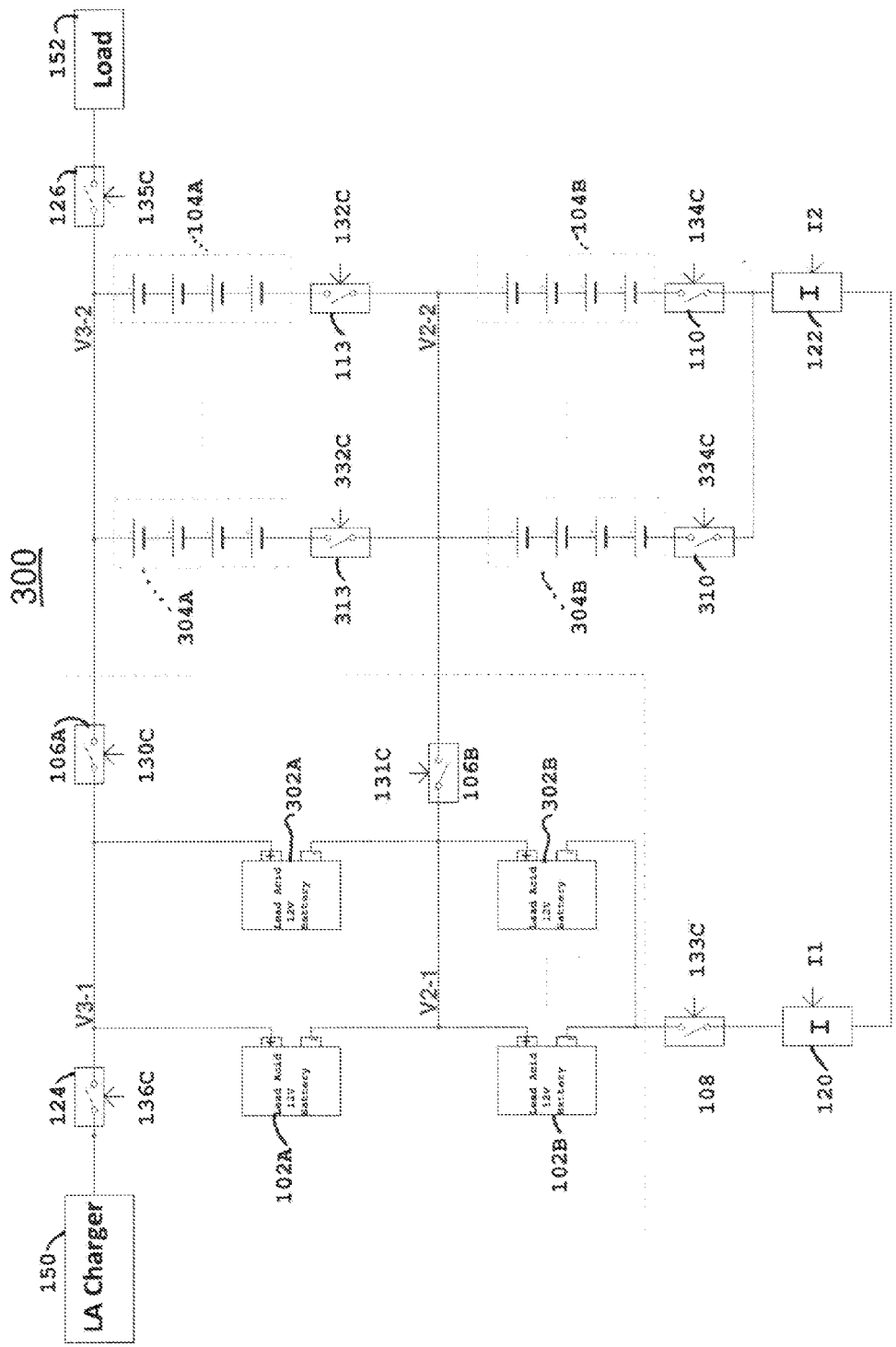
FIG. 5 is another diagram of a multi-chemistry battery system according to certain example embodiments.

The system 300 of FIG. 5 includes a first LA battery assembly 102 connected in parallel to a second LA battery assembly 302 (comprising two series-connected LA batteries 302A and 302B). Also, a second Li battery assembly 304 (comprising two series-connected Li batteries 304A and 304B) is connected in parallel with the first Li battery assembly 104.

Switches 106A and 106B are again disposed between the assemblies of different chemistries so that each collection of assemblies of the same chemistry can be selectively electrically isolated as discussed herein above.

Individual Li batteries 104A, 104B, 304A and 304B each have a respective adjacent switch 113, 110, 313 and 310 for the reasons discussed previously.

The system 300 can be connected to a load 152 and charger 150 also as discussed previously. Moreover, a BMS and or MCU can be used to control operation of the system 300 as discussed previously.

Certain features and benefits are exhibited by certain embodiments. For example, Lead acid (LA) batteries are good at discharging but require careful charging profile. Lithium ion (Li) batteries are very powerful at discharging and charging is more tolerant and much faster. Thus, a combination of LA and Li battery chemistries with the control circuitry disclosed herein permits the Li pack to drain faster than the LA pack and the LA pack can be used to charge the Li pack in a controlled manner. As a result, the Li pack will be charged and discharged frequently but the LA pack will only be discharging as the battery system is being used.

In another example, during charging, the Li pack can assist LA pack to balance out by intelligently conducting and draining charging current from an LA battery section that is weaker in capacity. This will help multiple LA batteries in series to be charged more evenly, especially when LA battery capacity varies due to aging.

Since Lithium ion batteries have much higher current driving capacities, during high loading conditions, lead acid batteries are automatically protected by having the Lithium ion batteries carrying most of the load. During charging, Li batteries can be conducted to the LA batteries in a digitally controlled manner in order to balance the LA batteries. This is because Li batteries have much lower internal resistance and when conducted with the LA batteries, the Li battery will temporarily bypass some of the LA battery charging. By choosing which section of the LA battery to conduct with the Li battery, an effective charge balancing between the LA batteries can be achieved. The Li batteries can be charged after LA batteries are fully charged since Li batteries have a much lower internal resistance. Also, LA battery charge and discharge operations can be pulsed to prevent sulfur build-up.

In one example implementation, the BMS 112 continues to monitor the current sensor 120 and the voltage level of V3-1. When a driver forgets turn off their car lights, or other power draining devices inside of the car when the driver leaves the car, the BMS 112 is configured to shut off (i.e. open) switch 126 (disposed between the battery system 100 and the load 152 when the battery capacity drops below a preset threshold. Thus, the power drain is eliminated. When the driver returns to the car and finds that there is no battery power (because switch 126 was opened), the driver can access the battery compartment and actuate a reset switch 128 to cause switch 126 to be closed again. This results in LA battery power being resumed while having preserved sufficient remaining battery capacity to restart the engine and return the vehicle to normal operation.

Costs can also be reduced by implementation of the present invention. Li batteries are roughly four times more expensive than LA batteries at similar capacity and with roughly one third of the weight. Combining the two chemistries has the benefit of reducing cost, maintaining capacity and user base, and increased lifetime. An intelligent dual chemistry system as disclosed herein can be configured designed as an extension or add-on to existing, post-deployment LA batteries. The benefit is to extend the overall battery life, increase load capability, and enable intelligent monitoring and diagnostics. Such combination of battery chemistries will result in an advantageous cost vs. performance balance.

Installation and adaptability is also improved. LA batteries are widely used in data centers, cars, golf carts and many other applications. Certain embodiments of the invention provide for an easy add-on Li battery pack for current LA batteries without any charger and existing infrastructure modification.

Lifetime (full charge and discharge cycle) compared to convention LA batteries is improved. Typical lifetime for LA chemistry is about 200 cycles, whereas Li chemistry batteries enjoy a significantly longer lifetime of about 600 to 2000 cycles, depending on the Li chemistry. The combined solution thus greatly enhances the standalone LA solution battery life.

In an additional aspect of certain embodiments, LA battery life and performance can be enhanced. For example, the invention can be used with a conventional vehicle LA battery to prevent the LA battery from over draining and needing to be jump-started or even be damaged, which would otherwise result in needing to replace the battery. In this embodiment, Li batteries need not be utilized for cost considerations. The implementation can be configured as an adapter that is attached to an existing LA vehicle battery.

In a further aspect, temperature sensors, such as thermocouples, are coupled to each of the battery assemblies and to the microcontroller. This enables the microcontroller to monitor temperature of the individual batteries to ensure that a dangerous buildup of heat does not occur. In the event that temperature of one or more cells of one of the packs rises above a set threshold, that pack can be isolated from the system until it cools to a temperature below a set threshold.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A battery system, comprising:
    a first battery assembly having a first type of battery chemistry;
    a second battery assembly having a second type of battery chemistry and comprising a first battery unit and a second battery unit, the second battery assembly electrically connected in parallel with the first battery assembly, the second type of battery chemistry being different than the first type of battery chemistry;
    a first switch disposed between the first battery assembly and second battery assembly;
    a second switch disposed between the first battery assembly and second battery assembly;
    a first current sensor disposed between the first battery assembly and electrical ground;
    a second current sensor disposed between the second battery assembly and electrical ground;
    a charger coupled to the battery system; and
    a third switch disposed between the charger and the first and second battery assemblies such that a charging operation can be disabled to both of the first and second battery assemblies simultaneously when the third switch is opened;
    a fourth switch disposed between the first battery unit and the second battery unit of the second battery assembly;
    a fifth switch disposed between the first current sensor and the second battery unit of the second battery assembly; and a battery management system coupled to the battery system, including the first, second, third, fourth and fifth switches and the first and second current sensors, the battery management system configured to monitor the voltage of the first battery assembly, monitor the voltage of the second battery assembly, monitor the current of the first current sensor, monitor the current of the second current sensor, and operate the first, second, third, fourth and fifth switches according to code resident in the battery management system to control the current path through the battery system such that the current path through the first battery assembly and the current path through the second battery assembly are independently controlled.

2. The battery system of claim 1, wherein the first type of battery chemistry is lead-acid and the second type of battery chemistry is lithium-ion.

3. The battery system of claim 1, wherein the first type of battery chemistry is lithium-ion and the second type of battery chemistry is a different lithium-ion.

4. The battery system of claim 1, wherein the battery management system is configured to determine an amount of charge flowing from the first battery assembly to the second battery assembly.

5. The battery system of claim 1, wherein the first battery assembly comprises a plurality of battery units, wherein the battery management system is configured to operate the first and second switches to disable charging to the second battery assembly upon reaching a full charge state while the first battery assembly continues to charge in a lead acid-type floating mode, and wherein the fourth and fifth switches are located relative to the first and second battery assemblies such that during the charging process a portion of a charging current provided to each of a first one of and a second one of the plurality of battery units of the first battery assembly can be controlled by pulsing open the fourth and fifth switches.

6. The battery system of claim 1, further comprising:
a sixth switch disposed between the first and second battery assemblies and a load being driven by the first and second battery assemblies such that the load is electrically isolated from the first and second battery assemblies when the sixth switch is opened, the sixth switch being coupled to the battery management system,
wherein the battery management system is configured to open the sixth switch to prevent over discharging of at least one of the first and second battery assemblies.

7. The battery system of claim 6, further comprising a user reset switch coupled to the battery management system to request that the battery management system close the sixth switch to reconnect the battery system to the load.

8. The battery system of claim 1, wherein the battery system is connected to a load, and wherein the battery management system is configured to pulse open and close at least one of the first and second switches to allow one of the first and second battery assemblies to drive the load at a lower driving current as compared to the driving current associated with the other of the first and second battery assemblies.

9. The battery system of claim 1, wherein the battery management system is configured to operate the first and second switches to permit the first battery assembly to charge the second battery assembly.

10. The battery system of claim 1, wherein the battery management system is configured to disconnect the battery system from a load to prevent damage to the first and second battery assemblies, and to reconnect the battery system to the load when either a charger is connected to the battery system or one of the first and second batteries has rested sufficiently to safely deliver more current to the load.

11. The battery system of claim 1, wherein the battery management system is configured to operate the first and second switches to maintain a voltage of the first battery assembly at a value higher than a voltage of the second battery assembly.

12. The battery system of claim 1, wherein the first chemistry is lead-acid, and wherein the battery management system is configured to periodically pulse conductivity between the first battery assembly and the second battery assembly to prevent sulfate buildup on an electrode of the first battery assembly.

13. A method of operating a battery system comprising a first battery pack and a second battery pack, each of the first and second battery packs comprising a different battery chemistry, the first battery pack comprising a plurality of battery units, the method comprising:
coupling the first battery pack to the second battery pack;
monitoring a voltage value of the first battery pack;
monitoring a voltage value of the second battery pack;
monitoring an electrical current value for the first battery pack;
monitoring an electrical current value for the second battery pack; and
operating a first switch and a second switch to control the current path through the battery system such that the current path through the first battery pack and the current path through the second battery pack are independently controlled;
coupling a charger to the first battery pack and the second battery pack;
operating a third switch to discontinue charging simultaneously to both of the first and second battery packs
pulsing open a fourth switch and a fifth switch to balance charging of the plurality of battery units of the first battery pack.

14. The method of claim 13, further comprising determining an amount of charge flowing from the first battery pack to the second battery pack.

15. The method of claim 13, further comprising:
charging the first and second battery packs; and
discontinuing charging to the second battery pack upon reaching a full charge state while continuing to charge the first battery pack.

16. The method of claim 13, further comprising:
coupling the first and second battery packs to a load; and
pulsing each of the first and second switches open and closed to allow the first battery pack to drive the load at a higher driving current as compared to the driving current associated with the second battery pack.

17. The method of claim 13, further comprising maintaining the voltage value of the first battery pack at a value higher value than the voltage value of the second battery pack.

18. The method of claim 13, further comprising periodically pulsing current between the first battery pack and the second battery pack to prevent sulfate buildup on an electrode of the first battery assembly.

19. A battery system, comprising:
a first lead-acid battery;
a lithium-ion battery connected in parallel with the first lead-acid battery;
a first switch disposed between the first lead-acid battery and the lithium-ion battery;

a second switch disposed between the first lead-acid battery and the lithium-ion battery;
a first current sensor coupled to the first lead-acid battery;
a second current sensor coupled to the lithium-ion battery;
a charger coupled to the battery system; and
a third switch disposed between the charger and the first lead-acid battery and the lithium-ion battery;
a battery management system coupled to the battery system, the battery management system configured to monitor a voltage value for the first lead-acid battery and a voltage value for the lithium-ion battery, monitor the first and second current sensors, operate the first and second switches to ensure that current does not flow from the lithium-ion battery into the first lead-acid battery, and operate the third switch to disable both of the first lead-acid battery and the lithium-ion battery simultaneously from the charger when the third switch is opened.

20. The system of claim 19, wherein the lithium-ion battery comprises a first battery unit and a second battery unit, wherein the system further comprises:
a second lead-acid battery connected in series with the first lead-acid battery;
a fourth switch disposed between the first battery unit and the second battery unit of the lithium-ion battery; and
a fifth switch disposed between the first current sensor and the second battery unit of the lithium-ion battery;
wherein the battery management system is further configured to:
operate the first and second switches to disable charging to the lithium-ion battery upon reaching a full charge state while the first and second lead-acid batteries continue to charge in a floating mode; and
pulse open the fourth switch and the fifth switch to balance charging of the first and second lead-acid batteries.

* * * * *